US006263119B1

(12) United States Patent
Martucci

(10) Patent No.: US 6,263,119 B1
(45) Date of Patent: *Jul. 17, 2001

(54) METHOD AND APPARATUS FOR RESIZING IMAGES USING THE DISCRETE TRIGONOMETRIC TRANSFORM

(75) Inventor: Stephen Anthony Martucci, Plainsboro, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/201,531

(22) Filed: Nov. 30, 1998

Related U.S. Application Data

(60) Provisional application No. 60/005,106, filed on Oct. 12, 1995.

(51) Int. Cl.[7] ........................................... G06K 9/32
(52) U.S. Cl. .......................... 382/298; 348/561; 348/581
(58) Field of Search .................................. 382/298, 299, 382/250, 264; 345/127, 130, 439; 348/561; 358/451

(56) References Cited

U.S. PATENT DOCUMENTS 5,168,375   12/1992   Reisch et al. ................... 358/432
5,262,854   11/1993   Ng ................................. 358/133
5,845,015   12/1998   Martucci ........................ 382/250
5,875,039   2/1999    Ohsawa et al. ................. 358/435
5,923,789   6/1999    Avinash ......................... 382/276
6,002,809   12/1999   Feig et al. ..................... 382/298
6,061,477   5/2000    Lohmeyer et al. .............. 382/300

OTHER PUBLICATIONS

Martucci, S., "Image Resizing in the Discrete Cosine Transform Domain", Proc. Intl Conf Image Proc., (Los Alamitos), pp. 244–247, Oct. 1995.
Prabhakar, R., "DCT scaling enables universal MPEG decoder", EDN Electrical Design News, 41(12), pg. 147–148, 150, Jun. 1996.

Primary Examiner—Joseph Mancuso
Assistant Examiner—Yosef Kassa
(74) Attorney, Agent, or Firm—William J. Burke

(57) ABSTRACT

A method and apparatus using the discrete cosine transform (DCT) to resize an image. To reduce an image, the method and apparatus exploits the convolution-multiplication property of the DCT to implement the anti-aliasing filter in the DCT domain, then the filtered coefficients are operated on to produce DCT coefficients of the reduced-size image. To increase an image, the DCT coefficients of the original image are operated on to produce coefficients of the larger image, then the convolution-multiplication property of the DCT is used to implement an anti-imaging filter. These DCT operations can be applied to the image as a whole or can be applied to non-overlapping blocks of the image.

16 Claims, 3 Drawing Sheets

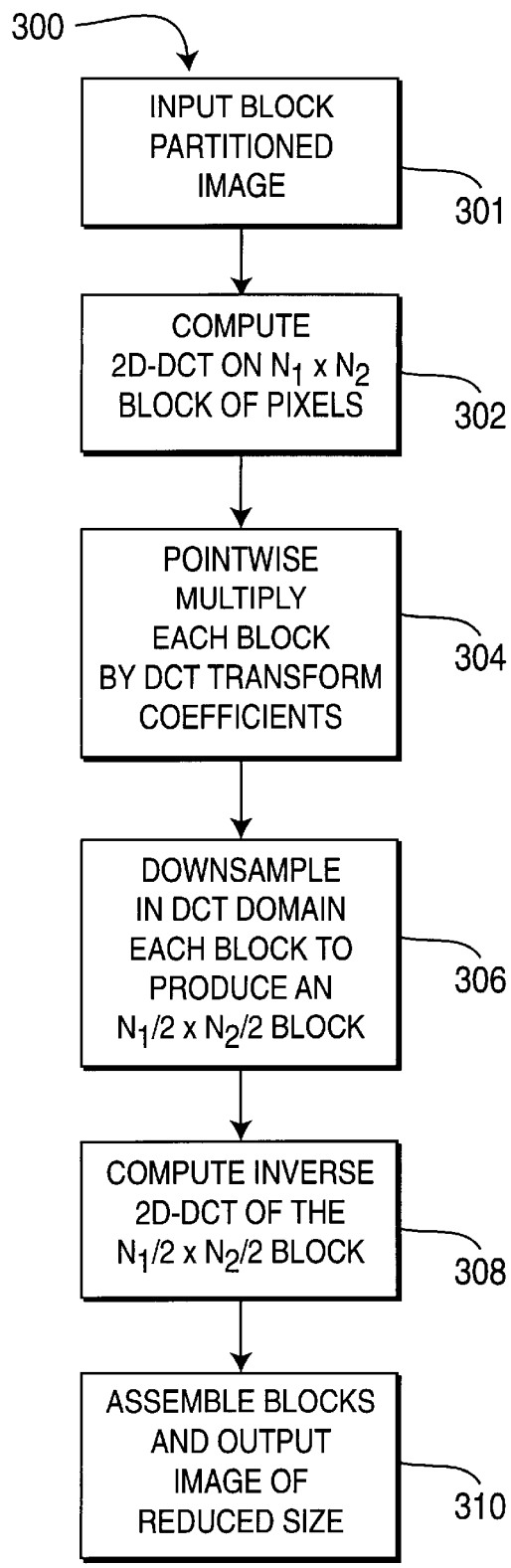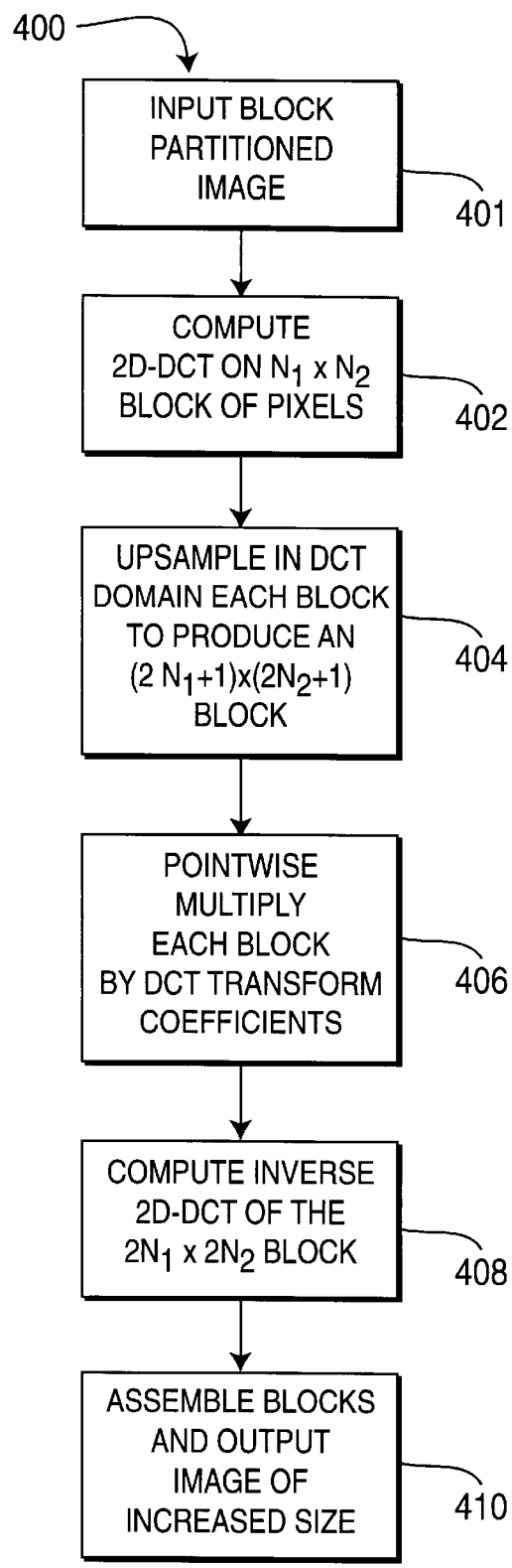
FIG. 3
FIG. 4

METHOD AND APPARATUS FOR RESIZING IMAGES USING THE DISCRETE TRIGONOMETRIC TRANSFORM

This is a continuation of application Ser. No. 08/728,459 filed on Oct. 10, 1996 (U.S. Pat. No. 5,845,015), which claims the benefit of U.S. Provisional Application No. 60/005,106 filed on Oct. 12, 1995, where each of the above applications is herein incorporated by reference.

The invention relates to methods of image processing and, more particularly, to a method and apparatus for resizing images.

BACKGROUND

With the explosion in quantity of and uses for digital images has come the need for efficient tools to manipulate those images. Image resizing is a fundamental and extremely important type of image manipulation. Any image resizing technique that can perform image resizing efficiently or that can be combined easily with other image processing functions is therefore of great value.

To resize a digital image, an image processing system typically performs two operations on the image: sampling rate change and lowpass filtering. To reduce an image to one-quarter of its original size (one-half in each dimension), a typical resizing technique first applies an anti-aliasing lowpass filter, then downsamples by two in each dimension. Typically, both the lowpass filtering and the downsampling (or decimation) are accomplished in the pixel domain.

To enlarge an image to four times its original size, the typical technique upsamples by two in each dimension, then applies an anti-imaging lowpass filter for interpolation. Again, both the upsampling (or interpolation) and the filtering are performed in the pixel domain.

Another method for reducing the size of an image is to apply a forward discrete cosine transform (DCT) to an image, followed by applying a smaller inverse discrete cosine transform (IDCT) as compared to the forward DCT. Such a system for reducing an image is disclosed in U.S. Pat. No. 5,262,854, issued Nov. 16, 1993, and incorporated herein by reference. However, image resizing using multiple domain image processing is generally complicated, costly, and not very rapid.

The discrete cosine transform (DCT) has become an important technique for image compression and constitutes the basis for many compression standards, e.g., the Joint Picture Experts Group (JPEG) image compression standard and the Moving Picture Experts Group (MPEG) video compression standard. Efficient techniques for computing a DCT have been and continue to be developed. It is also possible to use the DCT to implement digital filters as disclosed in S. A. Martucci, "Digital Filtering Of Images Using The Discrete Sine Or Cosine Transform," *SPIE Vol. 2308 Visual Communications and Image Processing '94*, (Chicago, Ill.), pp. 1322–1333, September 1994 (Martucci I) and S. A. Martucci, "Symmetric Convolution And The Discrete Sine And Cosine Transforms," *IEEE Transactions on Signal Processing*, vol. 42, pp. 1038–1051, May 1994 (Martucci II).

The DCT can be used to apply these filters on the image as a whole, on blocks that overlap before or after the transform then combined appropriately to give the same result as a linear convolution over the whole image, or on non-overlapping blocks that are processed independently of one another. Because the DCT implements a symmetric convolution, which implies smooth symmetric extensions at the image block boundaries, there are little to no visible artifacts resulting from this non-overlapping block processing. The advantages of using such blocks include the significant reduction in the complexity of the filtering operation and the ability to apply the filters on the same DCT coefficients computed for coding.

Heretofore, the DCT transform has been utilized solely for its filtering role and has not been used in the decimation/interpolation process. Therefore, there is a need in the art to combine, within an image resizing process, both a filtering function and a decimation/interpolation function within the DCT domain.

SUMMARY OF THE INVENTION

The invention is a method of resizing an input image comprising the steps of (a) performing a discrete cosine transform (DCT) on the input image to produce a plurality of DCT coefficients; (b) manipulating said plurality of DCT coefficients to effect filtering of the input image; and (c) performing an inverse discrete cosine transform (IDCT) on the manipulated DCT coefficients to produce a resized image of the input image.

The invention is also an apparatus for resizing an input image comprising a first transforming means for performing a discrete cosine transform (DCT) on the input image to produce a plurality of DCT coefficients; a manipulating means, coupled to said first transforming means, for manipulating said plurality of DCT coefficients to effect sampling of the input image; and a second transforming means, coupled to said manipulating means, for performing an inverse discrete cosine transform (IDCT) on the manipulated DCT coefficients to produce a resized image of the input image.

BRIEF DESCRIPTION OF THE DRAWING

The teachings of the invention can be readily understood by considering the following detailed description in conjunction with the accompanying drawings, in which:

FIG. 2 depicts a pixel resampling pattern resulting from application of the invention;

FIG. 3 depicts a flow chart of the routine used for performing image reduction; and FIG. 4 depicts a flow chart of the routine used for performing image expansion.

To facilitate understanding, identical reference numerals have been used, where possible, to designate identical elements that are common to the figures.

DETAILED DESCRIPTION

Figure 1:
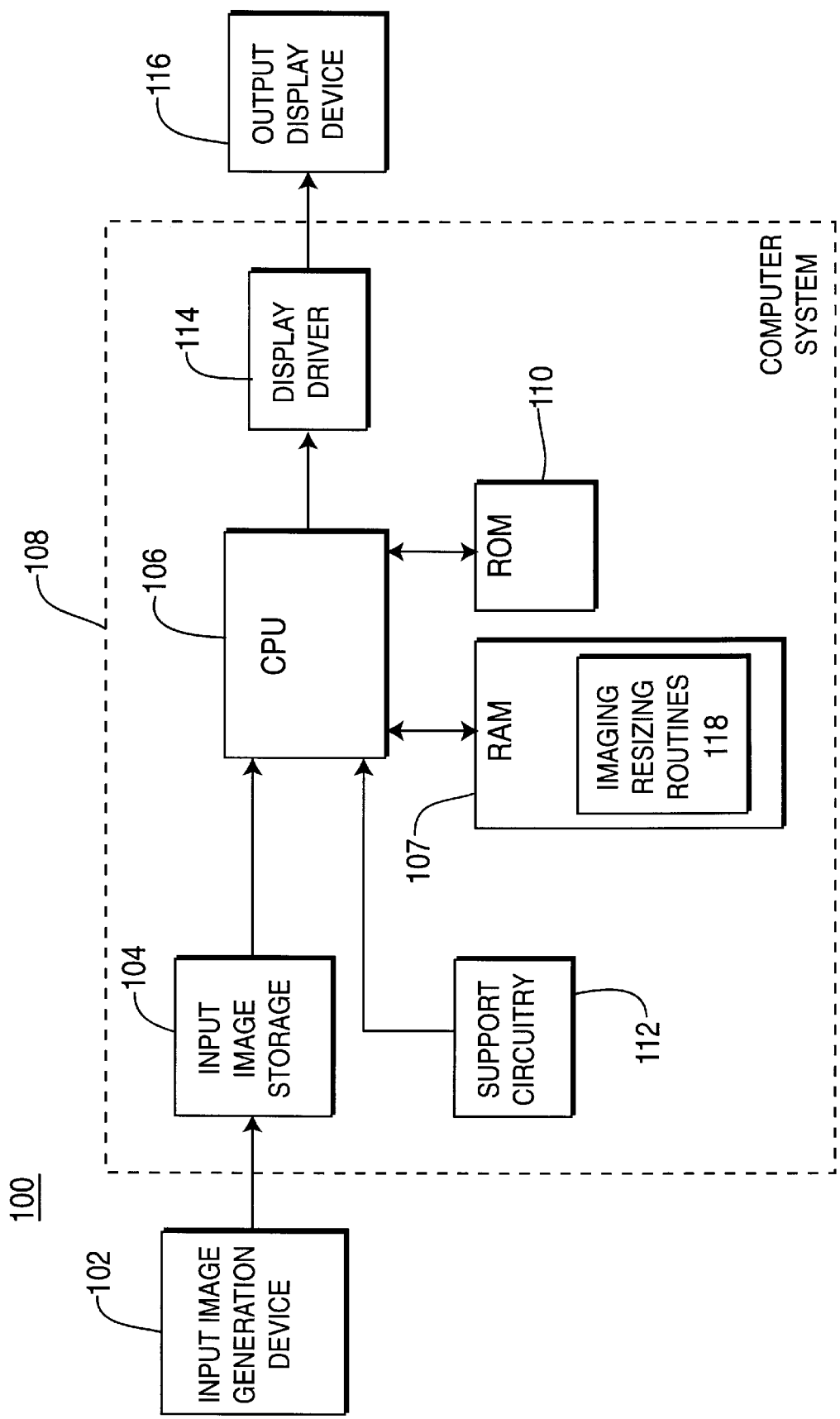
FIG. 1 depicts a general purpose computer system for executing the method of the present invention.

FIG. 1 depicts a block diagram of an image processing system 100 that utilizes the present invention. The image processing system 100 contains an image generation device 102, a computer system 108, and an output display device 116. Although, throughout the following disclosure, the term "image" is used to describe the data being operated upon by the invention, it should be understood that the term image is to be given broad meaning as any two-dimensional data set. As such, the inventive method is capable of resizing any two-dimensional data set.

The image generation device 102 can be a computer graphics system, image scanner, frame grabber, and the like. For the following discussion, this device is assumed to be an image scanner which generates a bitmap image (input image) containing a plurality of pixel values that are arranged in a pattern such as in uniform rows. Cumulatively, the rows of pixel values form the input image to an image resizing method. The image resizing method resizes an image either by expanding the image size or by reducing the image size. The resultant image is displayed upon the output image display device 116, e.g., a computer screen or image printer.

The image resizing method can be implemented by executing a software routine upon a personal computer, computer workstation, or other computer system, generally shown as reference 108. As such, as an alternative to the scanner for input image generation, the input image can be created using graphics software executing on the computer system 108. Consequently, the input image would be a computer file of data defining the input image.

The input image, whether created by the device 102 or graphics software, is temporarily stored in input image storage 104. The input image storage 104 can be a hard disk drive or integrated circuit random access memory. This storage is accessed by central processing unit (CPU) 106 and the CPU performs image resizing upon the recalled image.

The CPU 106 is a conventional microprocessor supported by standard hardware such as random access memory (RAM) 107, read only memory (ROM) 110, and general support circuitry 112, e.g., a power supply, a clock, and other such circuitry all of which is not specifically shown. The CPU 106 performs an image resizing by operating upon the pixels located within the input image. A display driver 114 formats the output image, i.e., the resized input image, into a display format that the output image display device 116 can utilize.

Although a general purpose computer system is shown as an illustrative platform for implementing the invention, the CPU 106 and its support circuits may be part of an image encoding or decoding system which requires image resizing functions. In such a system, the resized image may not be displayed, but rather, it may be further processed for transmission or storage.

Specifically, to perform resizing of an image, the CPU 106 executes resizing routines 118 stored in RAM 107. These routines are presented in FIGS. 3 and 4 and described below. These routines cause the CPU to recall an input image, or a portion of an input image. The resizing routines then operate upon the pixels within the input image to either expand or reduce the size of the image. Before describing these routines in detail, the reader will best understand the merits of the invention after a brief description of the use of discrete cosine transforms (DCTs) as part of the present invention.

The DCT commonly used for image compression is just one member of a family of 16 discrete sine and cosine transforms, collectively called discrete trigonometric transforms (DTTs). The convolution mode of the DTTs is a special type called "symmetric convolution". The details of symmetric convolution and its implementation using DTTs can be found in Martucci I and Martucci II.

The symmetric convolution of two finite sequences is equivalent to symmetrically extending the first sequence at both ends, symmetrically extending the second sequence on the left only, linearly convolving the two, then windowing the result. The second sequence is a special type, called a "filter-right-half", that the symmetric convolution operation extends to create a symmetric filter. That symmetric filter is applied to the first sequence after it has been symmetrically extended at both ends to supply boundary values for the filtering. Symmetric convolution can also be implemented by taking the appropriate inverse DTT of the element-by-element product of the forward DTTs of the inputs. The DTTs can therefore be used to implement digital filters where the type of filtering is that of symmetric convolution.

There are 40 distinct types of symmetric convolution and 16 distinct DTTs. The inventive technique uses only two types of symmetric convolution and only two DTTs. The technique of the invention only needs to compute one type of DTT, the type-2 DCT; the following discussion makes reference to the type-1 DCT but the technique does not need to compute the type-1 DCT.

The weighting function discussed below is defined as:

$$k(p) = \begin{cases} 1/\sqrt{2} & p = 0 \text{ or } N \\ 1 & p = 1, 2 \ldots N-1 \end{cases} \quad (1)$$

The orthogonal form of the type-2 DCT ($C_{IIE}$) of the sequence x(n), n=0, 1, 2, . . . N−1, is generally used for image compression and is computed according to:

$$X_{II}(m) = C_{IIE}\{x(n)\} = \sqrt{\frac{2}{N}} k(m) \sum_{n=0}^{N-1} x(n)\cos\left(\frac{\pi m\left(n+\frac{1}{2}\right)}{N}\right) \quad (2)$$

m=0, 1, . . . , N−1

The technique of the invention performs all filtering using an even-length symmetric filter. Suppose the L-tap filter h(n), n=L/2, . . . , L/2−1, is such a filter. For symmetric convolution, the filter-right-half is defined by:

$$h'(n) = \begin{cases} h(n) & n = 0, 1, \ldots, L/2 - 1 \\ 0 & n = L/2, \ldots, N-1 \end{cases} \quad (3)$$

where L/2≦N. Then, the technique computes the filter transform coefficients using the convolution form of the type-2 DCT ($C_{2e}$) according to:

$$H'(m) = C_{2e}\{h'(n)\} = 2\sum_{n=0}^{N-1} h'(n)\cos\left(\frac{\pi m\left(n+\frac{1}{2}\right)}{N}\right) \quad (4)$$

m = 0, 1, . . . , N−1

The first step for decimating the sequence x(n) to one-half its original length is to use h(n) to lowpass filter x(n). Note that the decimation process is accomplished in the DCT domain. The technique performs that filtering using the DCTs according to the following two equations:

$$Y_I(m) = \begin{cases} C_{2e}\{h'(n)\} \times C_{IIE}\{x(n)\} & m, n = 0, 1, \ldots, N-1 \\ 0 & m = N \end{cases} \quad (5)$$

$$w(n) = \frac{1}{k(n)} C_{IE}^{-1}\{Y_I(m)\} \quad m, n = 0, 1, \ldots, N \quad (6)$$

where $C_{IE}^{-1}$ denotes the orthogonal form of the inverse type-1 DCT and "x" denotes element by element multiplication. The length-(N+1)sequence, w(n), is the lowpass filtered x(n). To downsample w(n), the technique directly manipulates the sequence $Y_I(m)$ and bypasses Equation (6), i.e., the type-1 DCT is not used.

The technique uses a novel approach to perform pixel-domain sampling rate change using the DCT. The down-sampling property of the $C_{IIE}$ states that, for N-even, if:

$$y(n) = C_{IE}^{-1}\{Y_I(m)\} \quad m, n = 0, 1, \ldots, N \quad (7)$$

then:

$$y_d(n) = y(2n+1) = C_{IIE}^{-1}\left\{\frac{Y_I(m) - Y_I(N-m)}{\sqrt{2}}\right\} \quad (8)$$

$$m, n = 0, 1, \ldots, N/2 - 1$$

To decimate x(n) then, the technique uses Equation (5) to perform the filtering followed by Equation (8) to perform the pixel-domain downsampling. Although the weighting function k(n) causes Equation (6) to differ from Equation (7), the difference affects only the samples at n=0 and n=N. Because the downsampling operation in Equation (8) removes those samples, the k(n) in Equation (6) can be ignored and the $Y_I(m)$ of Equation (5) can be used directly in Equation (8) to yield the desired $y_d(n)$.

The first step for interpolating the sequence x(n) to twice its original length is to upsample. The upsampling property of the $C_{IIE}$ states that, if:

$$X_{II}(m) = C_{IIE}\{x(n)\} \quad m, n = 0, 1, \ldots, N/2-1 \quad (9)$$

then the technique sets $X_{II}(m) = 0$, m=N/2, ..., N, then:

$$X_{aI}(m) = C_{IE}\{x_u(n)\} = \left\{\frac{X_{II}(m) - X_{II}(N-m)}{\sqrt{2}}\right\} \quad (10)$$

$$m, n = 0, 1, \ldots, N$$

where:

$$x_u(n) = \begin{cases} 0 & n \text{ even} \\ x\left(\frac{n-1}{2}\right) & n \text{ odd} \end{cases} \quad (11)$$

The technique uses Equation (10) to manipulate the $C_{IIE}$ coefficients of x(n) to yield the $C_{IE}$ coefficients of the upsampled $x_u(n)$.

The technique follows upsampling with lowpass filtering by h(n) with a gain of two that is implemented using DCTs per the following two equations, valid for any v(n):

$$V_I(m) = C_{IE}\{k(n)v(n)\} \quad m, n = 0, 1, \ldots, N \quad (12)$$

$$y(n) = C_{IIE}^{-1}\{C_{2e}\{2h'(n)\} \times V_I(m)\} \quad m, n = 0, 1, \ldots, N-1 \quad (13)$$

Because $x_u(0) = x_u(N) = 0$, the weighting function k(n) in Equation (12) has no effect when $v(n) = x_u(n)$ giving $V_I(m) = X_{uI}(m)$. Therefore, the technique does not need to use Equation (12) but can instead use Equation (13) with $V_I(m)$ replaced by $X_{uI}(m)$. In summary, to interpolate x(n), the technique uses Equation (10) to perform the pixel-domain upsampling followed by Equation (13) to perform the filtering that generates y(n).

The following is a reiteration of the technique discussed above in the context of a method for resizing an image. The method uses the two-dimensional (2-D) equivalents of the one-dimensional (1-D) operations developed in the previous section by applying the 1-D operations consecutively in each of the two dimensions. The method divides the image into non-overlapping blocks of size $N_1 \times N_2$ pixels and processes each block independent of the others. The 2-D filter $h(n_1, n_2)$ can be any even-length, symmetric, lowpass filter of length up to twice the length in each dimension of the image block. The method can therefore use high quality filters with whatever filtering characteristics that are desired.

FIG. 2 depicts the locations of the pixels in an 8×8 pixel block before and after decimation/interpolation as performed by the inventive method. For the decimation process (image reduction), the invention starts with the 8×8 block of pixels (shown as X) and generates the 4×4 block of pixels (shown as O). For the interpolation process (image expansion), the invention starts with the 4×4 block of pixels and generates the 8×8 block of pixels. The even-length filters are implemented to give a 1/2-sample advance to the data. Further shifting results from the DCT-domain down/upsampling operations. The net result is a 1/2-sample shift in pixel locations, in additional to the change in sampling density, between the original image and the resized image.

FIG. 3 depicts a flow chart 300 of the steps for decreasing the size of an image by two in both dimensions. At step 301, the input image is supplied as a plurality of non-overlapping blocks, each containing $N_1 \times N_2$ pixels. Note that $N_1$ does not have to equal $N_2$, i.e., the block can be of any size and the size of each block may differ from that of another block. In fact, the invention could be used to perform resizing of any images and/or blocks. The method operates on each successive block as follows:

1. Compute the forward 2D-DCT of each $N_1 \times N_2$ block of the image using Equation (2) in each dimension (step 302);

2. Pointwise multiply each block by the transform coefficients of the 2-D lowpass filter-right-half, extracted from $h(n_1, n_2)$ using Equation (3) and transformed using Equation (4), to implement the anti-aliasing filter according to Equation (5) (step 304);

3. Perform the equivalent of pixel-domain downsampling of each block by manipulating the DCT coefficients as in Equation (8). By folding over the coefficients in both dimensions and pointwise subtracting, the method creates a block of size $N_1/2 \times N_2/2$ of the 2D-DCT coefficients of the corresponding downsampled block of $N_1/2 \times N_2/2$ pixels (step 306); and 4. Compute (at step 308) the inverse 2D-DCT of each $N_1/2 \times N_2/2$ block to produce the decimated image, e.g., a reduced size block at step 310.

The plurality of reduced size blocks can be further processed individually, or they can be reassembled into an image of smaller size than the input image. Although the foregoing method reduced the image in each dimension by a factor of two, the method can be used to reduce images by any factor.

FIG. 4 depicts a flow chart 400 of the steps for increasing the size of the image by two in both dimensions. At step 401, the input image is supplied as a plurality of non-overlapping blocks, each containing $N_1 \times N_2$ pixels. Again, note that $N_1$ does not have to equal $N_2$, i.e., the block can be of any size and the size of each block may differ from that of another block. Thus, the invention could be used to perform resizing of any images and/or blocks. The method operates on each successive block as follows:

1. Compute the forward 2D-DCT of each $N_1 \times N_2$ block of the image using Equation (2) in each dimension (step 402);

2. Perform the equivalent of pixel-domain upsampling of each block by manipulating the DCT coefficients as in Equation (10). By anti-symmetrically extending coefficients in both dimensions, the method creates a block of size $(2N_1+1) \times (2N_2+1)$ of 2D-DCT coefficients of the corresponding upsampled block of $(2N_1+1) \times (2N_2+1)$ pixels (step 404);

3. Pointwise multiply each block by the transform coefficients of the 2-D lowpass filter-right-half, extracted from $h(n_1, n_2)$ using Equation (3) and transformed using Equation (4), to implement the anti-imaging filter according to Equation (13) (step 406); and 4. Compute (at step 408) the inverse 2D-DCT of each $2N_1 \times 2N_2$ block to produce the interpolated image, e.g., an image of increased size at step 410.

The plurality of increased size blocks can be further processed individually, or they can be reassembled into an image of larger size than the input image. Although the foregoing method increases the image in each dimension by a factor of two, the method can be used to increase images by any factor.

Image resizing by the steps above differs from pixel-domain full-frame filtering and down/upsampling in that the image is processed block-by-block instead of as a whole. The artifacts this block processing introduces are confined to the block boundaries, but they are generally not visible. The half-sample shifts that result from the filtering and sampling rate change operations actually reduce the visibility of the block boundaries. In test images that have been resized using this technique, boundary artifacts are yet to be seen.

One advantage of processing an image by non-overlapping blocks is that it allows a spatially parallel implementation that can be both efficient and structurally simple. Another advantage is that such processing integrates easily into any block-DCT-based image compression system and with little additional complexity. Such systems may include JPEG, MPEG, H.261 and digital television.

For example, it is easy to integrate the inventive technique into the JPEG environment. If image resizing is to precede JPEG encoding, the input transform block size should be chosen so that the DCT-domain resizing produces the 8×8 blocks of DCT coefficients ready for the next stage of JPEG compression. There would then be no need to perform any further inverse or forward transforms. Furthermore, computational complexity can be greatly reduced by combining the multiplications necessary to perform the filtering with those of the quantization process.

If image resizing is to follow JPEG decoding, the resizing can instead be performed inside the JPEG decoder. Blocks of DCT coefficients of size 8×8 are available after the variable-length decode stage of JPEG. For image size reduction by four, for example, these 8×8 blocks of coefficients are operated upon, 4×4 inverse DCTs of all blocks are taken, and the result is a quarter-size decoded image. Furthermore, considerable computational savings are possible if the multiplications for filtering are combined with the multiplications for dequantization.

This invention describes a novel method and apparatus of using the discrete cosine transform (DCT) to resize an image, e.g., scaling an image or other two-dimensional data by a factor of two in both dimensions. The method is also useful in reducing an image, e.g., an image can be reduced to one-fourth its original size. The method exploits the convolution-multiplication property of the DCT to implement the anti-aliasing filter in the DCT domain, then the filtered coefficients are operated on to produce DCT coefficients of the reduced-size image. To increase an image to four times its original size, the DCT coefficients of the original image are operated on to produce coefficients of the larger image, then the convolution-multiplication property of the DCT is used to implement an anti-imaging filter. In both cases, the method produces a properly filtered and resampled image. These DCT operations can be applied to the image as a whole or can be applied to non-overlapping blocks of the image. These non-overlapping blocks can be, but do not have to be, the same as those used by a traditional block-DCT based image compression scheme such as JPEG.

More specifically, the method steps for decreasing the size of the image by two in both dimensions are:

1. Perform a forward two-dimensional, discrete cosine transform (2D-DCT) on each n×n block of the image. If decimating a JPEG-compressed image, the 2D-DCT coefficients are available after the variable-length decode of the JPEG image.

2. Pointwise multiply each block by the transform coefficients of the lowpass filter-right-half. This effectively performs a filtering operation.

3. Perform the equivalent of pixel-domain downsampling of each block by manipulating the DCT coefficients. Folding over the values in both dimensions and pointwise subtracting results in blocks of size n/2×n/2 that are the 2D-DCT coefficients of the corresponding downsampled block of n/2×n/2 pixels.

4. Perform the inverse 2D-DCT on each n/2×n/2 block yielding the decimated image. If decimation precedes JPEG encoding, there is no need to perform the inverse transform.

The steps for increasing the size of the image by two in both dimensions are:

1. Perform a forward 2D-DCT on each n×n block of the image. If interpolating a JPEG-compressed image, the 2D-DCT coefficients are available after the variable-length decode of the JPEG image.

2. Perform the equivalent of pixel-domain upsampling of each block by manipulating the DCT coefficients. By symmetrically extending values in both dimensions, what results are blocks of size 2n×2n that are the 2D-DCT coefficients of the corresponding upsampled block of 2n×2n pixels.

3. Pointwise multiply each block by the transform coefficients of the lowpass filter-right-half. This effectively performs a filtering operation.

4. Perform the inverse 2D-DCT on each 2n×2n block yielding the interpolated image. If interpolation precedes JPEG encoding, there is no need to perform the inverse transform.

The two procedures above implement an even-length symmetric filter of length up to twice the length in each dimension of an image block, thus allowing for quality filters. Another benefit is that if image resizing is being performed in conjunction with JPEG encoding, complexity could be further reduced by combining the multiplication required for quantization/dequantization with that for the filtering.

The inventive method demonstrates how to combine efficient filter implementation and sampling rate change by operating entirely in the DCT-domain. If performed using non-overlapping blocks of the image, the only difference from pixel-domain full-frame filtering and sampling rate change is that the image is processed block-by-block instead of as a whole. The only artifacts this block processing can introduce are confined to the block boundaries, but even these are generally not visible.

Furthermore, although the invention is describe as a routine recalled from the memory and executed by the CPU, those skilled in the art will realize that the functions described above can be implemented by various physical filters.

Although one embodiment incorporating the teachings of the invention has been shown and described in detail herein, those skilled in the art can readily devise many other varied embodiments that still incorporate these teachings.

What is claimed is:

1. A method of resizing an input image, said method comprising the steps of:

(a) performing a discrete trigonometric transform (DTT) on the input image to produce a plurality of DTT coefficients;

(b) manipulating said plurality of DTT coefficients to effect filtering of the input image by pointwise multiplying said plurality of DTT coefficients by a plurality of transform coefficients of a two-dimensional lowpass filter-right half, and downsampling said plurality of filtered DCT coefficients by folding said plurality of filtered DCT coefficients in both dimensions and applying pointwise subtraction; and (c) performing an inverse discrete trigonometric transform (IDTT) on the manipulated DTT coefficients to produce a resized image of the input image.

2. The method of claim 1, wherein said pointwise multiplying step is implemented in accordance with:

$$Y_I(m) = \begin{cases} C_{2e}\{h'(n)\} \times C_{IIE}\{x(n)\} & m, n = 0, 1, \ldots, N-1 \\ 0 & m = N \end{cases} ;$$

wherein said folding step is implemented in accordance with:

$$y_d(n) = y(2n+1) = C_{IIE}^{-1}\left\{\frac{Y_I(m) - Y_I(N-m)}{\sqrt{2}}\right\}$$

$$m, n = 0, 1, \ldots, N/2 - 1$$

and where $C_{2e}$ is an convolution form of a type-2 DCT, $C_{IIE}$ is an orthogonal form of a type-2 DCT, h'(n) is the right-half of a low-pass filter, x(n) is a finite sequence, N is an integer, $Y_I(m)$ is the result of the pointwise multiplying step, and $y_d(n)$ is the result of the folding step.

3. The method of claim 1, wherein the input image contains a plurality of blocks where said manipulating step (b) is applied to each of said plurality of blocks.

4. The method of claim 3, wherein each of said plurality of blocks is of different size.

5. A method of resizing an input image, said method comprising the steps of:

(a) performing a discrete trigonometric transform (DTT) on the input image to produce a plurality of DTT coefficients;

(b) manipulating said plurality of DTT coefficients to effect filtering of the input image by (b1) upsampling said plurality of DTT coefficients; and (b2) filtering said plurality of sampled DTT coefficients; and (c) performing an inverse discrete trigonometric transform (IDTT) on the manipulated DTT coefficients to produce a resized image of the input image.

6. The method of claim 5, wherein said upsampling step (b1) comprises the step of:

(b11) extending said plurality of DTT coefficients in two dimensions; and wherein said filtering step (b2) comprises the step of:

(b21) pointwise multiplying said plurality of sampled DTT coefficients by a plurality of transform coefficients of a two-dimensional lowpass filter-right-half.

7. The method of claim 6, wherein said extending step (b11) is implemented in accordance with:

$$X_{uI}(m) = C_{IE}\{x_u(n)\} = \left\{\frac{X_{II}(m) - X_{II}(N-m)}{\sqrt{2}}\right\};$$

$$m, n = 0, 1, \ldots, N$$

wherein said pointwise multiplying step (b21) is implemented in accordance with:

$$y(n) = C_{IIE}^{-1}\{C_{2e}\{2h'(n)\} \times V_I(m)\} \ m, n = 0, 1, \ldots, N-1$$

and where $C_{2e}$ is an convolution form of a type-2 DCT, $C_{IIE}$ is an orthogonal form of a type-2 DCT, h'(n) is the right-half of a low-pass filter, x(n) is a finite sequence, N is an integer, $X_{uI}(m)$ is the result of the extending step (b11), and y(n) is the result of the pointwise multiplying step (b21).

8. Apparatus for resizing an input image, said apparatus comprising:

a first transforming means for performing a discrete trigonometric transform (DTT) on the input image to produce a plurality of DTT coefficients;

a manipulating means, coupled to said first transforming means, for manipulating said plurality of DTT coefficients to effect sampling of the input image, wherein said manipulating means comprises a filter for filtering said plurality of DTT coefficients by pointwise multiplying said plurality of DTT coefficients by a plurality of transform coefficients of a two-dimensional lowpass filter-right-half, and a sampler for sampling said plurality of filtered DTT coefficients by folding said plurality of filtered DTT coefficients in both dimensions an applying pointwise subtraction; and a second transforming means for performing an inverse discrete cosine transform (IDTT) on the sampled DTT coefficients to produce a resized image of the input image.

9. Apparatus for resizing an input image, said apparatus comprising:

a first transforming means for performing a discrete trigonometric transform (DTT) on the input image to produce a plurality of DTT coefficients;

a sampler for sampling said plurality of DTT coefficients by extending said plurality of DTT coefficients in two dimensions;

a filter for filtering said plurality of sampled DTT coefficients by pointwise multiplying said plurality of sampled DTT coefficients by a plurality of transform coefficients of a two-dimensional lowpass filter-right-half; and a second transforming means for performing an inverse discrete cosine transform (IDTT) on the sampled DTT coefficients to produce a resized image of the input image.

10. A computer-readable medium having stored thereon a plurality of instructions, the plurality of instructions including instructions which, when executed by a processor, cause the processor to perform the steps comprising of:

(a) performing a discrete cosine transform (DCT) on the input image to produce a plurality of DCT coefficients;

(b) manipulating said plurality of DCT coefficients to effect filtering of the input image by pointwise multiplying said plurality of DCT coefficients by a plurality of transform coefficients of a two-dimensional lowpass filter-right-half; and downsampling said plurality of filtered DCT coefficients by folding said plurality of filtered DCT coefficients in both dimensions and applying pointwise subtraction; and (c) performing an inverse discrete cosine transform (IDCT) on the manipulated DCT coefficients to produce a resized image of the input image.

11. The computer-readable medium of claim 10, wherein said pointwise multiplying step is implemented in accordance with:

$$Y_l(m) = \begin{cases} C_{2e}\{h'(n)\} \times C_{IIE}\{x(n)\} & m, n = 0, 1, \ldots, N-1 \\ 0 & m = N \end{cases};$$

and wherein said folding step is implemented in accordance with:

$$y_d(n) = y(2n+1) = C_{He}^{-1}\left\{\frac{Y_l(m) - Y_l(N-m)}{\sqrt{2}}\right\}$$

$$m, n = 0, 1, \ldots, N/2 - 1$$

and where $C_{2e}$ is an convolution form of a type-2 DCT, $C_{IIE}$ is an orthogonal form of a type-2 DCT, h'(n) is the right-half of a low-pass filter, x(n) is a finite sequence, N is an integer, $Y_l(m)$ is the result of the pointwise multiplying step, and $y_d(n)$ is the result of the folding step.

12. The computer-readable medium of claim 10, wherein each of said plurality of blocks is of different size.

13. The computer-readable medium of claim 12, wherein each of said plurality of blocks is of different size.

14. A computer-readable medium having stored thereon a plurality of instructions, the plurality of instructions including instructions which, when executed by a processor, cause the processor to perform the steps comprising of:

(a) performing a discrete cosine transform (DCT) on the input image to produce a plurality of DCT coefficients;

(b) manipulating said plurality of DCT coefficients to effect filtering of the input image by (b1) upsampling said plurality of DCT coefficients; and (b2) filtering said plurality of sampled DCT coefficients; and (c) performing an inverse discrete cosine transform (IDCT) on the manipulated DCT coefficients to produce a resized image of the input image.

15. The computer-readable medium of claim 14, wherein said upsampling step (b1) comprises the step of:

(b11) extending said plurality of DCT coefficients in two dimensions; and wherein said filtering step (b2) comprises the step of:

(b21) pointwise multiplying said plurality of sampled DCT coefficients by a plurality of transform coefficients of a two-dimensional lowpass filter-right-half.

16. The computer-readable medium of claim 15, wherein said extending step (b11) is implemented in accordance with:

$$X_{ul}(m) = C_{IE}\{x_u(n)\} = \left\{\frac{X_{II}(m) - X_{II}(N-m)}{\sqrt{2}}\right\};$$

$$m, n = 0, 1, \ldots, N$$

and wherein said pointwise multiplying step (b21) is implemented in accordance with:

$$y(n) = C_{IIE}^{-1}\{C_{2e}\{2h'(n)\} \times V_l(m)\} \quad m, n = 0, 1, \ldots, N-1.$$

and where $C_{2e}$ is an convolution form of a type-2 DCT, $C_{IIE}$ is an orthogonal form of a type-2 DCT, h'(n) is the right-half of a low-pass filter, x(n) is a finite sequence, N is an integer, $X_{ul}(m)$ is the result of the extending step (b11), and y(n) is the result of the pointwise multiplying step (b21).

* * * * *

UNITED STATES PATENT AND TRADEMARK OFFICE
CERTIFICATE OF CORRECTION

PATENT NO. : 6,263,119 B1  Page 1 of 1
DATED : July 17, 2001
INVENTOR(S) : Stephen Anthony Martucci It is certified that error appears in the above-identified patent and that said Letters Patent is hereby corrected as shown below:

Title page,
Item [60], Related U.S. Application Data, replace "Provisional application No. 60/005,106, filed on Oct. 12, 1995." with -- This is a continuation of Application No. 08/728,459 filed on October 10, 1996 (US Patent 5,845,015), which claims the benefit of US Provisional Application No. 60/005,106 filed on October 12, 1995. --.

Column 4,
Line 35, equation 3, replace "$h'$" with -- $h^r$ --.
Line 44, equation 4, replace "$H'$" with -- $H^r$ --.
Line 56, equation 5, replace "$\{h'$" with -- $\{h^r$ --.

Column 5,
Line 49, equation 13, replace "$\{2h'$" with -- $\{2h^r$ --.

Column 9,
Line 22, replace "$\{h'$" with -- $\{h^r$ --.

Column 10,
Line 11, replace "$\{2h'$" with -- $\{2h^r$ --.

Column 11,
First equation, replace "$\{h'$" with -- $\{h^r$ --.
Second equation, replace "$He$" with -- $IIE$ --.

Column 12,
Line 29, replace "$\{2h'$" with -- $\{2h^r$ --.

Signed and Sealed this

Fifteenth Day of April, 2003

JAMES E. ROGAN
*Director of the United States Patent and Trademark Office*